Figure 1:
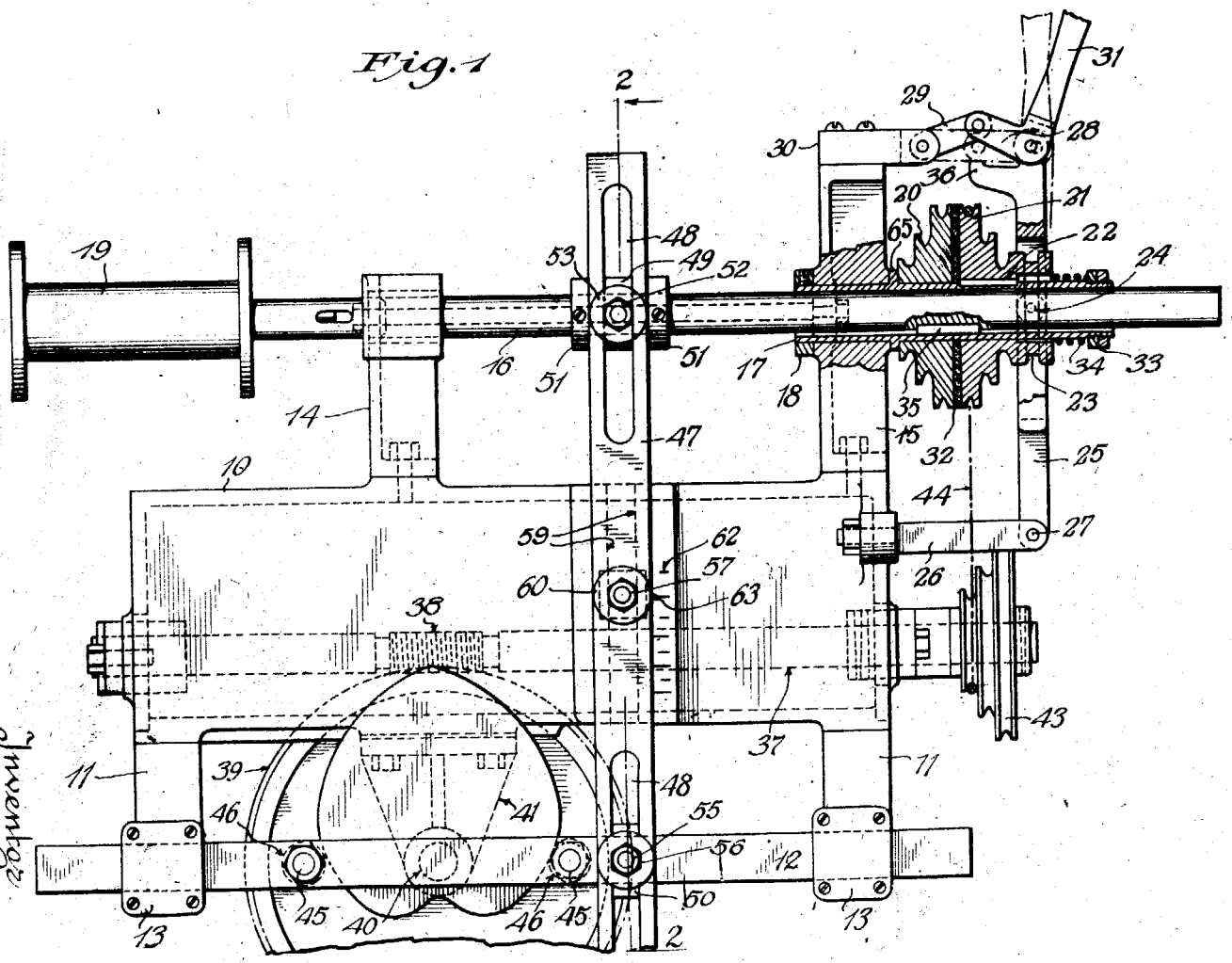

Jan. 24, 1928. Re. 16,859

W. D. PIERSON

SPOOLING MECHANISM

Original Filed May 19, 1924 2 Sheets-Sheet 1

Inventor
William D. Pierson
by George H. Mac
Attorney

Jan. 24, 1928. Re. 16,859
W. D. PIERSON
SPOOLING MECHANISM
Original Filed May 19, 1924 2 Sheets-Sheet 2
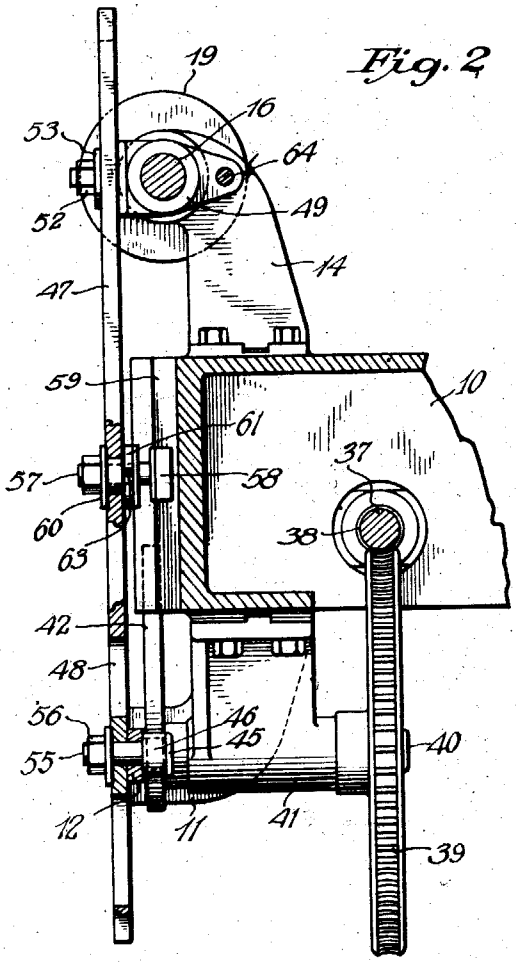
Inventor
William D. Pierson
by George E. Hall
Attorney Reissued Jan. 24, 1928.

Re. 16,859

UNITED STATES PATENT OFFICE.

WILLIAM D. PIERSON, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

SPOOLING MECHANISM.

Original No. 1,545,451, dated July 7, 1925, Serial No. 714,441, filed May 19, 1924. Application for reissue filed June 3, 1927. Serial No. 196,363.

This invention relates to a new and improved spooling mechanism of the type generally used in winding wire upon a spool or the like and associated with a wire drawing machine.

There are numerous other uses to which this mechanism can be applied and therefore I do not limit myself to the use above set forth.

It is the object of this invention, among other things, to provide a mechanism of the character mentioned wherein the rotary spindle will receive a reciprocatory motion adjustable in length but uniform in the speed of its travel, and both of these actions controlled by a make and break connection with a source of power, of simple design, that is readily controlled, and to accomplish these and other desirable results with mechanism of simple design, that is economically constructed, and readily assembled, so as to withstand the maximum strain, with the minimum wear.

To these, and other ends, my invention consists in the spooling mechanism, having certain details of construction and combinations of parts, as will be hereinafter described and more particularly pointed out in the claims.

Referring to the drawings, in which like numerals of reference designate like parts in the several figures;

Figure 1 is a fragmentary front elevation of my improved spooling machine, partly in section; and Figure 2 is a fragmentary transverse sectional view thereof, the parts in section being taken generally upon line 2—2 of Figure 1.

This type of mechanism is usually associated with a wire drawing machine for winding on a spool the wire drawn thereon.

With some machines the spool moves back and forth while rotating, during which time the wire is wound thereon between the flanges thereof and in other cases the spool may merely rotate without a reciprocatory movement, in which case the wire is guided thereon.

In these operations it is desirable that the spool or the guide, whichever it may be, should move back and forth at a uniform speed so as to insure a uniform winding of the wire. This is accomplished in my invention with mechanism that will permit of such adjustments as will vary the extent of the reciprocatory movement without varying the uniform speed of travel thereof and with the exercise of the minimum labor and skill.

Referring to the drawings; 10 designates the body of the machine, to the underside of which is fixed the companion brackets 11 within which is slidably mounted the traverse bar 12 that is held against lateral movement in one direction by the caps 13.

This body member may be of any convenient form or shape and mounted upon standards or legs, or attached directly to a wire drawing or similar machine, or otherwise supported, within the spirit of my invention.

Secured on the top of the body 10 are the standards 14 and 15, within the former of which the spindle 16 is rotatably mounted and in the latter of which a sleeve 17 is journaled, being held against endwise movement in one direction by a collar 18 and by a shoulder 65. The spindle is slidable within the sleeve 17 and held against rotation therein by the key 35 which projects into a spline or keyway in the spindle. On one end of the spindle 16 is a spool 19, which is connected therewith in any well known manner. The shape, form and size of this spool obviously can be varied, and it may be attached or secured to the spindle also in any well known or convenient manner.

The sleeve 17 is rotated through a cone pulley 20 which is rotatably mounted upon the sleeve 17 and driven by a belt from any source of power. Slidably mounted upon the sleeve 17 but held against rotation thereon by a sliding fit key 22 is a cone pulley 21 having an annular groove 23 therein, into which project the blocks 24 connected within the lever 25, in a well known manner. This lever is hinged at its lower end by the pintle 27 to the post 26 fixed in the body 10 and is connected at its upper end with the link 28 making a toggle mechanism with link 29.

Between the cone pulleys 20 and 21 is a friction disk 32 and surrounding the sleeve 17 between the outer end of the pulley 21 and the lock nuts 33 threaded thereon is a compression spring 34. The tension of this spring is varied by shifting the position of the lock nuts 33 on the sleeve 17. As shown in Figure 1, the handle 31 which is integral with link 28 is thrown to the right and the pulleys 20 and 21 and friction disk 32 are all under spring tension, thus rotating the sleeve 17 and spindle 16.

The rotation of the spindle is stopped by moving the lever 31 to the left, that is, to the position shown by broken lines in Figure 1, at which time the hinged connection of the links 28 and 29 will be in a substantially straight line, also outlined by broken lines, with the link 28 engaging the stop lug 36 on the lever 25. When so positioned, the pulley 21 is moved to the right and the spring 34 is compressed, thus removing the friction upon the disk 32 and cone pulley 20.

There is no pressure against the blocks 24 within the groove 23 except when the spindle 16 is at rest, therefore, neither the blocks or the groove into which they project are subjected to anything but the most nominal wear. Thus to put the spindle in motion it is only necessary to shift the handle 31 from the dotted to the full line position, which moves the pulley 21 against the friction disk 32, and the compression spring 34 holds it thereagainst with all the pressure that is required to operate the spindle and still permit a slipping of the spool during the winding operation.

It is almost impossible to time the speed of rotation of the spindle 16 with the speed of the wire as it comes from the wire drawing machine, and therefore, it is the practice to rotate the spool at a slightly higher speed and arrange for a relative slip between some of the parts. This has usually been done by a loose belt drive, which is unsatisfactory because among other things it slips at the wrong time, and not sufficiently at the right time.

The mechanism herein shown for driving this spindle may be adapted for purposes other than this particular type of machine and the spindle may also be driven by other types of mechanism, for illustration, the geared mechanism as used on the ordinary engine lathe for driving the spindle.

Journaled in the body 10 and held against endwise movement therein by any convenient form of mechanism, is a shaft 37 having a worm 38 thereon, which meshes into the teeth of a worm gear 39 fixed on a shaft 40 journaled in a bracket 41 secured to the body 10 and having a heart shaped cam 42 upon the opposite end thereof.

A cone pulley 43 keyed or otherwise fixed on the shaft 37 is driven by a belt 44 from the cone pulley 21 so that the spindle 16 and shaft 37 come to a full stop at one and the same time.

Rotatably mounted upon the studs 45 fixed in the bar 12 are the cam rolls 46, both of which are always in contact with the face of the heart shaped cam 42. As both sides of this cam are alike, any two points diametrically opposite each other are the same distance apart as every other two points so related, and therefore this cam imparts a positive uniform reciprocatory motion to the bar 12 in both directions and also an instantaneous reverse movement at each end of each stroke.

The link bar 47 is provided near its opposite ends with slots 48, within the upper of which is slidably mounted the block 49 and in the lower the block 50. The block 49 encircles the spindle 16 and is held against endwise movement relatively thereto by the adjustably secured collars 51. A suitable nut 52 and collar 53 upon the threaded portion of the block 49 provide for a suitable operative connection therebetween and the link bar.

The block 50 is mounted upon a stud 55 that projects through the bar 12 and having a nut 56 upon the outer end thereof.

This link bar 47 is pivotally mounted at a point between the ends thereof upon a stud 57 having a T-head 58, which is movably mounted within a slot 59 in the body 10, and is provided with suitable collars 60 and 61, as is usual.

The axis of the shaft 40 is normal to the path of movement of the traverse bar 12, which latter is parallel with the spindle 16 so that a reciprocatory movement of the bar 12 is imparted to the spindle 16. The length of the reciprocatory movement of the spindle 16 is varied within its extreme limits by shifting the position of the stud 57 that forms a fulcrum for the bar 47, thus producing in the spindle an absolutely variable length of stroke without affecting its uniform speed of movement.

To facilitate adjustment within predetermined limits one face of the body 10 adjacent to the slot 59 is graduated, as at 62, and a finger 63 is attached to the link bar 47 and registers with such graduation.

When this mechanism is designed for use with the type of machine wherein the spool may rotate without a reciprocatory movement the sleeve 17 may be entirely omitted or remain integral with the shaft, as desired.

A guide finger, or other similar mechanism well known in the art may be substituted for the spool 19.

There are minor changes and alterations that may be made within my invention, aside from those herein suggested, and I would therefore have it understood that I do not limit myself to the exact construction herein shown and described but claim all that falls fairly with the spirit and scope of the appended claims.

Having described my invention, what I claim as new and desire to secure by Letters Patent, is:—

1. In combination with a spindle; of means for imparting a rotary movement thereto, comprising a sleeve held against relative rotary movement but permitting axial movement of the spindle therein; a pulley connected with the sleeve; a second pulley rotatably mounted upon the sleeve; a friction plate between the pulleys; yielding means for moving one of the pulleys in relation to the other so as to hold the plate in frictional engagement with each of the pulleys, whereby motion is transmitted from one of the pulleys to the other and through it to the spindle; and independent means for moving one of the pulleys against the yielding means.

2. In combination with a spindle; of means for imparting a rotary movement thereto, comprising a driving member rotatable relatively to the spindle, a driven member held against rotation relatively to the spindle, a friction element between said members, yielding means for moving one of said members in relation to the other so as to hold the friction element in engagement with each of the members, whereby motion is transmitted from one member to the other and through it to the spindle; independent means for moving one of the members against the yielding means, comprising a lever with a stop lug thereon having an operative engagement with the driven member and a toggle connection with a fixed part, the movement of which in one direction is limited by the stop lug.

3. In a device of the character described; a body member; a spindle; means for imparting a rotary movement thereto, comprising a driving member rotatable relatively to the spindle, a driven member held against rotation relatively to the spindle, a friction element between the members, yielding means for moving one of the members in relation to the other so as to hold the friction element in engagement with each of the members, whereby motion is transmitted from one member to the other and through it to the spindle; and means for imparting a reciprocating movement to the spindle that is uniform in speed throughout the length of such movement, comprising a shaft driven from the driven member, a second shaft, the axis of which is normal to that of the shaft, a worm and gear connection between the shaft and second shaft, a cam fixed on the second shaft, a bar moving substantially parallel with the spindle through the action of a cam, a link bar connecting the spindle and bar; and means for pivotally and adjustably securing the link bar to the body member.

In testimony whereof, I have hereunto affixed my signature.

WILLIAM D. PIERSON.